United States Patent Office 3,531,917
Patented Oct. 6, 1970

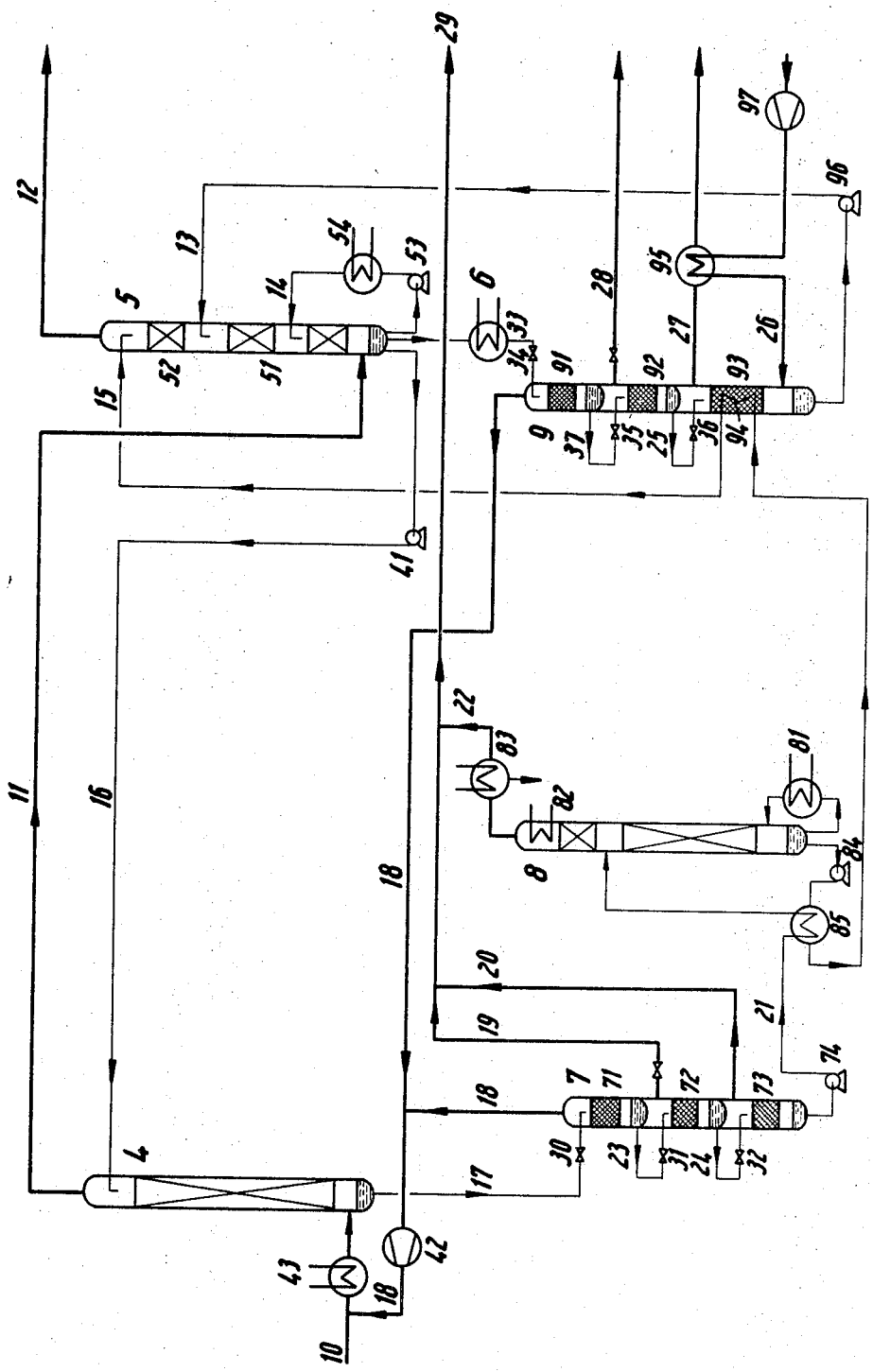

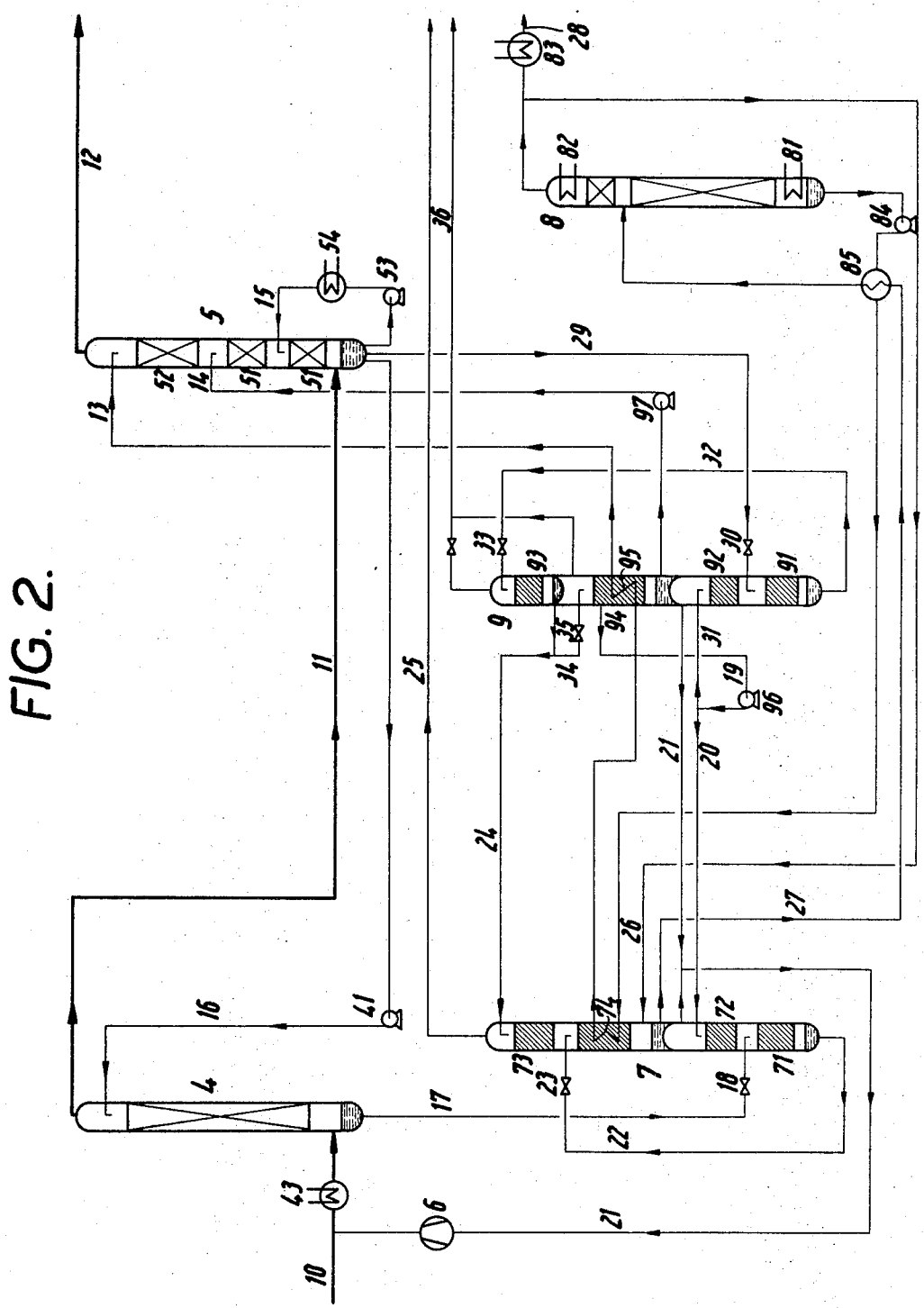

3,531,917
PROCESS FOR A SELECTIVE REMOVAL MAINLY OF H₂S AND CO₂ BY SCRUBBING FROM FUEL AND SYNTHESIS GASES
Gerhard W. Grünewald, Mainz-Mombach, and Gerhard Hochgesand, Neu-Isenburg, Germany, assignors to Metallgesellschaft Aktiengesellschaft, Frankfurt am Main, Germany
Filed Oct. 11, 1967, Ser. No. 674,558
Claims priority, application Germany, Oct. 14, 1966, M 71,261, M 71,264
Int. Cl. B01d 53/14
U.S. Cl. 55—42
18 Claims

ABSTRACT OF THE DISCLOSURE

Process for removing $CO_2$ and sulfur containing components of fuel gas or synthesis gas by absorption wherein the gas to be purified is passed through an $H_2S$ absorber and then through a two-stage $CO_2$ absorber.

Substantially pure absorbent is introduced into the second stage of the $CO_2$ absorber and, after passing through both $CO_2$ absorption stages, passes through the $H_2S$ absorber. Additional partially regenerated absorbent is introduced into the first $CO_2$ absorption stage and removed from the system for regeneration between the first and second $CO_2$ absorption stages. The absorption process is carried out at below about 0° C.

---

The processes of purifying commercial fuel gases and synthesis gases, such as are produced from solid or liquid fuels or recovered as natural gas or obtained by a conversion of gaseous fuels, serve mainly for removing the acid components consisting of hydrogen sulfide and carbon dioxide, the organic sulfur compounds, COS and unsaturated hydrocarbons from the crude gas. The major part by volume of these impurities consists of carbon dioxide and hydrogen sulfide, as a rule.

Numerous processes for accomplishing that purification have been disclosed. Particularly those absorption processes have gained commercial importance, in which the gas is scrubbed in one or more stages with liquid absorbents, which depending upon their dissolving power absorb the impurities from the gas simultaneously or in succession and are thereafter regenerated to release the gaseous constituents they have absorbed and are recycled to the scrubbing treatment. These absorption processes may be generally divided into two groups, namely, into the processes using chemically and physically active absorbents, respectively.

The first group includes particularly the scrubbing processes using aqueous solutions of inorganic or organic bases or alkali salts of weak inorganic acids. These processes depend on stoichiometric laws and the amount of steam used for regenerating is in most cases proportional to the amount of acid components removed by scrubbing. For these reasons, said processes are mainly suitable for removing acid impurities present in the crude gas at a low to moderate concentration, and in cases in which inexpensive heat is available.

When large quantities of gases, which contain the acid components to be removed in high proportions, are to be purified, physical scrubbing processes employing organic solvents as absorbents are increasingly being used. The physical scrubbing processes differ from the chemical scrubbing processes in that the amount of component being removed is a function of solubility coefficient which varies with temperature, and, approximately with the total pressure under which the scrubbing process is carried out. In these processes, the solubility of a gas in the scrubbing fluid increases with a decrease of temperature and with a rise in pressure. In accordance therewith, the regeneration is effected by a pressure drop (flashing) and/or by an increase of temperature.

The advantages of physical scrubbing processes as regards capacity and energy requirement become more important as the pressure of the gas to be purified is increased because an increase in gas pressure results in a reduction of the amount of scrubbing fluid which is required and enables an increasing part of the regeneration to be effected merely by flashing the scrubbing fluid.

The physical scrubbing processes are generally performed at ambient or lower temperatures, preferably below about 0° C. The selected temperature depends in most cases on the volatility of the absorbent which is employed. If the crude gas is under a high pressure of about 60 atmospheres absolute or more, the scrubbing temperatures may be above 0° C. even in the known low-temperature scrubbing processes using methanol or acetone.

In one of these known processes, methanol is used as an absorbent at temperatures below —10° C. and under pressures in excess of 2 atmospheres gauge. This process is applied to the purification of a crude gas produced by the pressure gasification of coal. This crude gas is obtained under a pressure of 20 atmospheres gauge pressure and contains about 4% by volume sulfur compounds and about 30% by volume $CO_2$. When the crude gas has been cooled and the condensate has been removed, the resulting gas is scrubbed at —30° to —40° C. in a single stage to give a gas which has the same quality as synthesis gas. These processes can be carried out at a gas rate of 50,000 to 150,000 standard cubic meters per hour. $CO_2$ and $H_2S$ as well as the organic sulfur compounds and preferably unsaturated hydrocarbons known as resin precursors are jointly removed in this scrubbing process.

Generally in this scrubbing process a cooling and preliminary scrubbing treatment is effected to separate those substances which can be condensed below or approximately at the absorption temperature, such as water and higher hydrocarbons, and is followed by a scrubbing treatment in which the acid constituents of the gas are jointly removed from the crude gas. As a result, these acid constituents of the crude gas consist mainly of $CO_2$ and $H_2S$ and are jointly removed from the exhaust gas.

As the exhaust gases must not contain sulfur, as a rule, when they are discharged into the atmosphere, they must be subjected to a suitable processing before. Such a removal of sulfur from exhaust gases is highly expensive if sulfur is present in a low concentration, as is generally the case in the removal of $CO_2$ and $H_2S$ from fuel gases and synthesis gases because the sulfur content of the crude gas is often less than ⅟₂₀ its $CO_2$ content.

For this reason, $CO_2$ and $H_2S$ are usually removed from the crude gas in two stages if the removal is effected by absorption in an organic solvent. In the first scrubbing stage, those sulfur components are removed which are more readily soluble in the solvent than $CO_2$. Residual $CO_2$ is removed from the gas in the second scrubbing stage. The exhaust gas from the first scrubbing stage can be processed more easily because it is deficient in $H_2S$. The exhaust gas from the second scrubbing stage contains no sulfur and may be safely discharged into the atmosphere.

Because the sulfur components have a higher solubility, a relatively small amount of scrubbing fluid is sufficient in the first scrubbing stage of the two-stage process. This scrubbing fluid must be highly regenerated because stringent requirements must be fulfilled as to the absence of sulfur from the purified gas.

Whereas the second scrubbing stage is carried out approximately at the same temperature as the first, the rate at which the scrubbing fluid must be circulated through the second stage must be higher in accordance with the lower solubility of $CO_2$. On the other hand, the regeneration need not be so thorough because the residual $CO_2$ content which is permissible in the pure gas is in most cases much higher than the $H_2S$ content which can be tolerated.

It has previously been usual to use separate solvent streams in the two scrubbing stages even if the same solvent was used in both stages. In this case, the scrubbing fluid is fed after complete regeneration to the absorption tower for the first scrubbing stage and together with the sulfur components removes a considerable part of the $CO_2$ contained in the crude gas. As a result, the scrubbing fluid used to remove $H_2S$ takes up a correspondingly large quantity of heat of absorption and its capacity for dissolving $CO_2$ is poorly utilized.

It is therefore an object of this invention to provide a novel process for the removal of $CO_2$ and sulfur containing components, particularly $H_2S$, from fuel or synthesis gas.

It is another object of this invention to provide a novel $CO_2$ and $H_2S$ absorption process.

It is a further object of this invention to provide a novel $CO_2$ and $H_2S$ absorption process utilizing organic absorbents.

Other and additional objects of this invention will become apparent from a consideration of this entire specification, including the drawing and claims hereof.

In accord with and fulfilling these objects, one aspect of this invention resides in a process comprising introducing a gas containing $CO_2$ and sulfur-contatining components into an $H_2S$ absorber and then into a two-stage $CO_2$ absorption means; introducing principal absorbent into the second stage of said $CO_2$ absorption means, and thence into the first stage of said $CO_2$ absorption means; introducing additional absorbent into the first stage of said $CO_2$ absorption means; removing said additional absorbent from said first stage of said $CO_2$ absorption means; removing said principal absorbent from said first stage of said $CO_2$ absorption means and introducing such to said $H_2S$ absorption means; introducing the absorbent emerging from said $CO_2$ absorption stage into said $H_2S$ absorption means; and recovering product purified gas from said second $CO_2$ absorption means.

It has been found that the disadvantages of the prior art can be avoided if the $H_2S$ and $CO_2$ absorption means are interconnected in such a manner that the absorbent which has been used in the $H_2S$ absorption means and which has subsequently been completely regenerated is then used first as an absorbent for $CO_2$ in the $CO_2$ absorption means and only thereafter for a removal of $H_2S$ in the $H_2S$ absorption means. In this process, the absorbent which enters the $H_2S$ absorption tower is saturated with $CO_2$ and is only slightly heated in said tower because the crude gas contains in most cases only a small amount of sulfur components so that only a small quantity of such components is absorbed.

The rate at which the absorbent is circulated through the two absorption means is selected to effect a complete removal of $H_2S$ in the $H_2S$ absorption means and is not sufficient for a complete removal of $CO_2$ in the $CO_2$ absorption means. For this reason, the above-described large cycle including both absorption towers has superimposed thereon, in the $CO_2$ absorption means an additional, small absorbent cycle, which serves only for a coarse removal of $CO_2$ in the lower portion of the $CO_2$ absorption tower and requires only a coarse regeneration.

The principal absorbent of the large cycle referred to above is conducted from the bottom of the $CO_2$-removing tower to the top of the $H_2S$-removing tower. The remaining absorbent (additional absorbent) is conducted in the small cycle to a coarse regenerating unit. In the coarse regenerating unit, the additional absorbent is regenerated only by flashing and/or with the assistance of a stripping gas used in the last flashing stage and is then recycled to the $CO_2$-absorption tower at a level where the absorbent trickling down from the top of the tower has approximately the same $CO_2$ content as the regenerated additional absorbent. Above this inlet, $CO_2$ is removed from the gas to a permissible residual content by the principal absorbent flowing in the large cycle. This principal absorbent has been completely degasified in the regenerating column. The residual content of $CO_2$ may be as small as about 10–50 p.p.m.

In this process, the temperatures at which the absorption of $H_2S$ and the final purification of the gas to remove $CO_2$ are effected are so selected in view of the total gas rate, which decreases during the purification of the gas, that absorbent for the final removal of $CO_2$ in the $CO_2$ absorption means is required approximately at the same rate as for the removal of $H_2S$ (and $CO_2$) in the $H_2S$ absorption means. In many cases, however, it is found, that absorbent at a higher rate is required for the final removal of $CO_2$ unless special precautions are taken.

It has been found that the rate at which absorbent is required for the final removal of $CO_2$ can be reduced if the $CO_2$-laden principal absorbent flowing in the coarse scrubbing cycle is cooled when it has left the $CO_2$-removing tower and before it is regenerated. This cooling may be effected in a heat exchanger which is indirectly cooled with evaporating ammonia. As a result of such cooling, the temperatures at which the regeneration is effected by flashing and, if desired, stripping, are lower than without such cooling. The coarsely regenerated absorbent is fed at a lower temperature to the $CO_2$-removing tower and the subsequent final removal of $CO_2$ in the upper portion of the $CO_2$-removing tower is also effected at a lower temperature. The minimum rate at which absorbent is required in this tower is thus reduced and may be of the same order as the rate required in the $H_2S$-removing stage. This arrangement has the further advantage that the reduction of the operating temperature of all flashing stages results in a decrease of the absorbent losses caused by evaporation into the flashed-off gases.

The invention relates to a process for the selective removal mainly of $CO_2$ and $H_2S$ from fuel gases and synthesis gases by an absorption treatment carried out in two major stages with an organic solvent, such as methanol or xylene, under an elevated pressure, preferably above about 20 atmospheres absolute, and at temperatures below the ambient temperature, preferably below about $-10°$ C. wherein all sulfur compounds, particularly $H_2S$, are removed in the $H_2S$ absorption means, and $CO_2$ is removed in the $CO_2$ absorption means.

According to the invention, laden absorbent leaving the $H_2S$-removing unit is completely regenerated by flashing and stripping or boiling, and is then cooled and supplied to the top of the $CO_2$-removing tower, in which it is saturated to a high degre with $CO_2$ and is conducted from the bottom of the $CO_2$-removing tower to the top of the $H_2S$-removing tower. To assist the absorption of $CO_2$ in the $CO_2$ absorption means, an additional absorbent stream is circulated, which is withdrawn from the bottom of the $CO_2$-removing tower and is partly regenerated by flashing and, if desired, stripping and returned into the $CO_2$-removing tower on a level on which the absorbent trickling down has approximately the same $CO_2$ content as the principal absorbent at that level. Above that level, the final removal of $CO_2$ is effected with the absorbent which has been withdrawn from the $H_2S$ absorption means and has then been completely regenerated.

To reduce the operating temperature at which the last-mentioned, final removal of $CO_2$ is effected and thus to reduce the rate at which completely regenerated absorbent is required, the additional absorbent which is circulated through the $CO_2$ absorption means is cooled when it has left the $CO_2$-removing tower and before said additional absorbent is partly regenerated by flashing and, if desired, stripping with an inert gas. Inert gas, particularly nitrogen, is in most cases available in large gas-producing plants at the rate which is required for this purposes.

Another aspect of this invention resides in the further incorporation of re-absorbers to effectively separate the $H_2S$ from the $CO_2$ thereby increasing the value of both materials.

It has been found that by a suitable use of re-absorbers, which are units for a re-absorption of gas components which have been dissolved and subsequently released by a reduction of pressure or partial pressure, the value of the entire process is increased. For instance, exhaust gas having a high $H_2S$ content can be obtained in the purification of crude gases having a low $H_2S/CO_2$ ratio, particularly of 1:30 or less, by means of physically acting, organic solvents if the gas is purified in two consecutive stages using the same absorbent as set forth above, and the laden absorbent draining from the $H_2S$ absorption means is subjected to a material exchange with a countercurrent flow to increase the concentration of $H_2S$. For this purpose, the absorbent leaving the bottom of the $H_2S$ absorption means is first pre-flashed for a recovery of the useful components and is then supplied to a countercurrent column, which acts like a rectifying column and operates under a medium pressure, which is between the crude gas pressure and atmospheric pressure.

The pre-flashed abortent is fed into the countercurrent regenerating column at an intermediate point thereof and then flows down in a countercurrent to the rising gas, which has a high $H_2S$ content, so that the absorbent absorbs additional $H_2S$ while part of the $CO_2$ in solution in the absorbent is stripped out. The absorbent is conducted from the bottom of the column through a heat exchanger to a second flasher column, where it is completely degasified in known manner by boiling. Part of the exhaust gas which is thus driven off and which has a high $H_2S$ content is used as product and the remainder is recycled to the bottom of the second flasher ($H_2S$ rich absorbent) column. After the material exchange in the lower part of the second flasher column, the exhaust gas it scrubbed in the upper part with $H_2S$-free absorbent charged at the top of the column so that the top product is virtually free of sulfur.

If the sulfur compounds are highly enriched in the lower part of the countercurrent column, the high solubility of these sulfur components will result in a very high loading of the absorbent therewith, and a relatively large amount of gas must be recycled to the bottom of the countercurrent column. For this reason it is desirable in many cases to raise the operating temperature in the lower part of the countercurrent column with the aid of an incorporated or attached heat exchanger, which is suitably heated with steam and/or warm, regenerated absorbent. In this way, the dissolving power of the absorbent is reduced with respect to all gas components so that the loading of the absorbent is reduced and a lower gas recycle rate is sufficient for enriching. The heat exchanger may be eliminated entirely or in part if the dephlegmator of the regenerating column is disconnected or throttled and the recycle gas is fed into the countercurrent column at a high temperature and a corresponding high content of absorbent vapor so that the operating temperature is sufficiently raised as a result of the condensation of the absorbent vapor and the cooling of the gas.

In the manner described, the $H_2S$-$CO_2$ mixture initially absorbed by the absorbent in the $H_2S$ absorption means is released during the regeneration treatment in two partial streams, namely, a $CO_2$-containing exhaust gas, which is free of sulfur and withdrawn from the top of the countercurrent column, and a high-$H_2S$ exhaust gas withdrawn from the top of the regenerating column. As the sulfur components are completely removed from the crude gas in the $H_2S$ absorption means, the second absorption means serves only for the removal of the $CO_2$ which has remained in the crude gas. After this $CO_2$ absorption stage, regeneration is effected in known manner by flashing and, if a high purity is required, with the aid of a stripping gas in the last flashing stage. The resulting exhaust gas is also free of sulfur.

In a manner entirely analogous to the regeneration of the additional absorbent described above, the absorbent charged at the top of the countercurrent enriching column is suitably not completely regenerated but has been used in the $CO_2$ absorption means for removing $CO_2$ from the crude gas and after leaving the absorption tower for $CO_2$ is flashed to the pressure of the enriching column.

The re-asborber provided to reduce the recompression work is suitably mounted on that flash chamber from which the gas to be recompressed is withdrawn. The laden absorbent withdrawn from the $H_2S$ absorption means is partly flashed in the lower part of the unit consisting of the flash chamber and the re-absorber to release the gases to be recompressed. The acid ballast gases, mainly $CO_2$, are removed in the upper part of said unit with the aid of absorbent from the ascending, flashed-off gases before the latter are supplied to the recompressor for returning them into the pressure gas. This mode of re-absorption has been performed in various cases but only with the aid of completely regenerated absorbent for the re-absorption. In the present case, it is not necessary to remove all acid components from the gas which is to be recompressed but it is sufficient to reduce the volume of this gas stream as far as possible in order to reduce the energy required for compressing the gas. It is entirely sufficient to lower the $CO_2$ content, e.g., from an initial value of 80% to 20%. For this purpose, it is not necessary to use for the re-absorption an absorbent which has been completely regenerated at a relatively high expense but it is possible to use a partly regenerated absorbent. For instance, if the first flashing stage, from which the gases to be recompressed are withdrawn, is operated under a pressure of 8 atmospheres absolute, the absorbent used for the re-absorption may have been only partly regenerated by being flashed to atmospheric pressure.

This aspect of this invention provides a process of removing mainly $H_2S$ and $CO_2$ from fuel gases and synthesis gases by absorbing them in two major stages in an organic solvent, such as methanol, acetone, xylene, toluene or the like, in which process the sulfur components are removed in the first, $H_2S$, absorption means and are then enriched in a countercurrent column so that they can be subjected to further processing for producing elementary sulfur or sulfuric acid, whereas $CO_2$ is removed from the pressure gas in the second, $CO_2$, absorption means from which sulfur-free $CO_2$ free gas is released. The absorbent laden with $H_2S$ and $CO_2$ is charged to an intermediate part of the countercurrent column and in the lower part of said column is contacted with a countercurrent of a high-$H_2S$ product so that $H_2S$ is enriched in the absorbent. In the upper part of the countercurrent column, the sulfur components contained in the gas which rises from the lower part are scrubbed back by a partial stream of sulfur-free absorbent.

In the practice of this aspect of this invention, the absorbent required in the $H_2S$ absorption means and the absorbent required in the countercurrent enriching column for a re-absorption of $H_2S$ are withdrawn from the $CO_2$ absorption means, where the absorbent has been highly saturated with $CO_2$ removed from the crude gas. That partial stream of the absorbent which is required for a re-absorption of $H_2S$ is first flashed to the operating pressure of the enriching column when said partial stream has been withdrawn from the $CO_2$ absorption means.

The flashed-off gases from the first flashing stages of the regenerating units of the first and second absorption cycles are returned by a compressor into the pressure gas for a recovery of useful components. The compressor is suitably preceded by a re-absorber, or two re-absorbers connected in parallel, so that most of the $CO_2$ ballast is removed from said flashed-off gases. According to the invention, absorbent which has been only partly regenerated is used for this purpose. Alternatively, the useful gases enriched by the re-absorption of $CO_2$ may be discharged as a fuel gas of high calorific value without recompression.

Understanding of this invention will be facilitated by reference to the accompanying drawing in which:

FIG. 1 is a schematic flow diagram of the process of this invention; and

FIG. 2 is similar to FIG. 1 showing an improved process.

Referring to this drawing and particularly to FIG. 1 thereof, the plant has an $H_2S$ absorption tower 4, a $CO_2$ absorption tower 5 having a coarse first scrubbing zone 51 and a final second scrubbing zone 52, a flash tower 7 including flash chambers 71, 72 and 73 and serving to flash the methanol which is laden with $H_2S$, a regenerating column 8 comprising a reboiler 81, a dephlegmator 82 and a condenser 83 and serving for a hot regeneration of the $H_2S$-laden methanol, and a flash tower 9 comprising flash chamber 91, 92, and 93 and serving to regenerate the $CO_2$-laden methanol.

To simplify the drawing the flow diagram does not illustrate heat exchangers which may serve for a recovery of refrigeration from exhaust gas, pure gas and absorbent and which may be connected between various points of the plant if an adequate temperature difference is available between such points.

The gas to be purified is introduced through a conduit 10 including a system of heat exchangers 43, in which the gas is cooled by indirect heat exchange. After condensate removal, the gas flows through the $H_2S$ absorber 4 wherein $H_2S$ is removed together with the other sulfur compounds to their desired final content by scrubbing with $CO_2$-laden scrubbing fluid.

The desulfurized gas flows through conduit 11 to the $CO_2$ absorber 5 and rises in said absorber through the coarse scrubbing zone 51 and the final scrubbing zone 52 countercurrent with respect to the cold scrubbing fluid, which is supplied through conduits 13, 14, and 15 and which is trickled down through the absorber. The purified gas leaves the absorber 5 at the top and is carried by the conduit 12 to further processing.

The scrubbing fluid required for removing the sulfur compounds is withdrawn from the bottom of the second ($CO_2$) absorber 5 and is supplied by the pump 41 through a conduit 16 to the top of the first ($H_2S$) absorber 4.

Scrubbing fluid from the bottom of the first absorber 4 flows through a conduit 17 into a flash chamber 71. The conduit 17 has a pressure relief device 30 incorporated therein. A first, partial flashing is effected in the flash chamber 71 to release the low-solubility components, mainly $H_2$ and CO, which are dissolved in the scrubbing fluid. These components are combined in a conduit 18 with the corresponding gases from a flash chamber 91. The combined gases are compressed by a compressor 42 and returned into the crude gas at a point before the heat exchanger system 43.

The partly flashed scrubbing fluid is supplied through conduits 23 and 24, which incorporate pressure relief devices 31 and 32, to two further flash chambers 72 and 73 and is thus flashed approximately to atmospheric pressure.

The flashed-off gases are transferred from the chambers 72 and 73 via the conduits 19 and 20 into heat exchangers, which are not shown.

The flashed scrubbing fluid flows through a conduit 21 to a pump 74, by which it is pumped through a heat exchanger 85 into the regenerating column 8, which is heated by the reboiler 81.

The dephlegmator 82 incorporated at the top of the regenerating column produces the reflux which is required. Most of the absorbent vapor contained in the gases which leave the column 8 are condensed in condenser 83. The non-condensable gases flow through conduit 22 and are combined with the other flashed-off gases which contain $H_2S$.

The completely regenerated absorbent is pumped from the regenerating column 8 by a pump 84 through heat exchangers 85 and 94 in a conduit 15 to the top of the $CO_2$ absorber 5.

That portion of scrubbing fluid which is to be regenerated only by flashing and, if desired, stripping, is withdrawn through conduit 33 from the bottom of the $CO_2$ absorber 5 and flows through a heat exchanger 6 and a pressure-relief device 34 into the flash chamber 91 of the regenerating tower 9. In the heat exchanger 6, the scrubbing fluid is cooled by an indirect heat exchange with evaporating $NH_3$.

The gas which has been released by the partial flashing contains almost all $H_2$ and CO that were dissolved in the scrubbing fluid and is conducted through conduit 18 to the compressor 42, which returns the flashed-off gas into the crude gas.

The partly flashed scrubbing fluid flows through conduits 37 and 25, which incorporate pressure-relief devices 35 and 36, into the chambers 92 and 93 of the regenerating tower 9 and is further flashed in these chambers. In the chamber 93, the absorbent has been flashed approximately to atmospheric pressure and trickles over the heat exchanger 94 so that the absorbent is heated. This facilitates the stripping of $CO_2$ to the desired final content with the aid of a stripping gas, which is blown into the flash chamber 93 through a conduit 26. The cold mixture of $CO_2$ and stripping gas leaving the flash chamber 93 supplies refrigeration to the stripping gas in the heat exchanger 95. The stripping gas is blown by a compressor 97 through the heat exchanger 95 and a conduit 26 into the flash chamber 93.

The flashed-off gas is withdrawn through a conduit 28 from the flash chamber 92.

A pump 96 transfers partly regenerated methanol from the bottom of the flash chamber 93 in conduit 13 to the top of the coarse scrubbing zone 51 in the absorption tower 5.

The $CO_2$ absorber 5 is provided with a cooling cycle to compensate for refrigeration losses. A pump 53 sucks scrubbing fluid at the required rate from the bottom of the absorber and supplies it through the $NH_3$ evaporator 54, where the required refrigeration is supplied, and in conduit 14 to a higher point of the coarse scrubbing zone 51.

QUANTITATIVE EXAMPLE I

It may be assumed that the gas to be purified has been pre-cooled to a temperature below 0° C., has been freed of condensate, and that it has the following composition when entering the first stage of the gas purification system:

| | Percent |
|---|---|
| $CO_2$ | 30 |
| $H_2S$ | 1 |
| $H_2$ | 53 |
| CO | 14 |
| Balance ($CH_4$, $N_2$) | 2 |

It may be assumed that the plant is operated at a gas inlet rate of 100,000 standard cubic meters per hour and under an inlet pressure of 28 atmospheres absolute, and that methanol is used as a scrubbing fluid.

In the heat exchanger system 43, the crude gas supplied through conduit 10 is cooled to about −32° C. by an indirect heat exchange with product gases, exhaust gases, and evaporating $NH_3$ and is then supplied to the absorber 4 for removing the sulfur components.

The desulfurized gas, from which $CO_2$ has not yet been removed, leaves the $H_2S$ absorber 4 approximately at the same temperature and flows through a conduit 11 into the $CO_2$ absorber 5. About 80% of the $CO_2$ contained in the gas is removed by scrubbing in the lower part 51 of the absorber 5 and the remaining 20% is removed in the upper part 52 of the absorber 5.

Gas having the following composition:

| | Percent, about |
|---|---|
| $H_2$ | 77 |
| CO | 20 |
| Balance ($CH_4/N_2$) | 3 | leaves the scrubbing tower 5 at a rate of about 69,000 standard cubic meters per hour and a temperature of about −65° C. and under a pressure of about 26.3 atmospheres absolute. Methanol, at a rate of about 80 cubic meters per hour, is required for removing $H_2S$ by scrubbing in the $H_2S$ absorber 4 and is withdrawn at a temperature of about −32° from the bottom of the absorber 5.

The absorbent withdrawn from the bottom of the $H_2S$ absorber 4 is first flashed in the three flash chambers 71, 72, and 73 approximately to atmospheric pressure and is subsequently regenerated completely in the column 8.

The regenerated absorbent is cooled in heat exchangers 85 and 94 and is pumped to the top of the final scrubbing zone 52.

Methanol, at a rate of about 160 cubic meters per hour is required in the coarse scrubbing zone 51, in addition to the absorbent which trickles down from the final scrubbing zone 52, for removing $CO_2$ by scrubbing in the $CO_2$ absorber 5. The additional methanol is withdrawn from the bottom of $CO_2$ absorber 5, cooled in the $NH_3$ evaporator 6, then regenerated by three flashing and stripping treatments in column 9, and finally recharged at a temperature of about −64° C. to the coarse scrubbing zone 51.

The absorbent is flashed to about 7 atmospheres absolute in the first flash chambers 71 and 91 of the two flash columns 7 and 9. Gas at a rate of about 1400 standard cubic meters per hour in chamber 71 and at a rate of about 700 standard cubic meters per hour in chamber 91 is thus released and is jointly compressed by the compressor 42 and returned into the crude gas.

When the $H_2S$-containing absorbent is regenerated in the flash chambers 72 and 73, gas at a total rate of about 6000 standard cubic meters per hour is flashed off and together with gas escaping from the methanol during the subsequent hot regeneration at a rate of about 5000 standard cubic meters per hour is discharged through a conduit 29 for further processing. The gas exhausts at a rate of about 11,000 standard cubic meters per hour and contains about 9% $H_2S$.

Almost pure $CO_2$, at a rate of about 11,000 standard cubic meters per hour, is flashed off in the chamber 92 of flash tower 9. $CO_2$, at a rate of about 9000 standard cubic meters per hour, is stripped in the stripping stage 93 with the aid of stripping gas, supplied at a rate of about 10,000 standard cubic meters per hour. The gas mixture leaving the chamber 93 cools the incoming stripping gas in the heat exchanger 95.

The concept of cooling the laden absorbent from the second stage by the ammonia-evaporating cooler before the absorbent is regenerated may also be applied to the first stage. For this purpose, the conduit 17 may incorporate a heat exchanger, which may also evaporate ammonia or through which an available cold gas, e.g., the gas flashed off from chamber 92, is passed as a heat-absorbing fluid.

As a result of this withdrawal of heat, the absorbent, which has been completely regenerated in column 8, is supplied at a lower temperature from the heat exchanger 85 to the heat exchanger 94 and also reaches the top of the absorption column 5 at a lower temperature.

Referring now to FIG. 2 of the drawing, the plant consists essentially of an $H_2S$ absorption tower 4, a $CO_2$ absorption tower 5 having a coarse scrubbing zone 51 and a final scrubbing zone 52, a flash tower 7 for flashing the $H_2S$-laden methanol absorbent, a regenerating column 8 comprising a reboiler 81, a dephlegmator 82 and a condenser 83, serving for a hot regeneration of the $H_2S$-laden methanol, and a flash tower 9 comprising flash chambers 91, 93 and 94 and serving for regenerating the $CO_2$-laden methanol. The flash chamber 91 is provided with a re-absorption zone 92. The flash tower 7 comprises a flash chamber 71, which is provided with a re-absorption zone 72, and a flash chamber 73, which is designed as a countercurrent enriching stage.

The gas to be purified is pre-cooled and freed from condensate and supplied at about −10° C. through a conduit 10 into a final cooler 43, where the gas is cooled to about −30° C. by an indirect heat exchange. The gas flows then through the absorber 4 for a removal of the $H_2S$ and the other sulfur compounds.

The desulfurized pressure gas flows in conduit 11 to the $CO_2$ absorber 5 and ascends in said absorber in a countercurrent to the cold absorbent, which is supplied through conduits 13, 14 and 15 and which is trickling from above.

The purified pressure gas leaves the absorber 5 at the top and is supplied by the conduit 12 to the further processing.

The absorbent required for removing the sulfur compounds is withdrawn from the bottom of the $CO_2$ absorber 5 and is supplied by the pump 41 through conduit 16 to the top of the $H_2S$ absorber 4. Absorbent from the bottom of the $H_2S$ absorber 4 flows through conduit 17 into the flash chamber 71. The conduit 17 incorporates a pressure relief device 18.

In the flash chamber 71, a first, partial flashing is effected to release the low-solubility useful gas components, mainly $H_2$ and CO, which are dissolved in the absorbent. Partly regenerated absorbent is supplied to the top of the overlying re-absorption zone 72 by a pump 96 from the flash chamber 94 through conduits 19 and 20 and is used in the re-absorption zone 72 to remove most of the $CO_2$ contained in the flashed-off gases from chamber 71. The remaining gas is compressed by the compressor 6 together with the gas from the corresponding stage 92 of the tower 9 for flashing off $CO_2$ and is returned through conduit 21 into the crude gas.

The absorbent used for the re-absorption flows through the flashing stage 71 and together with the absorbent charged to said stage is flashed through conduit 22, incorporating a pressure relief device 23, into the countercurrent column 73 at an intermediate point thereof. The top of the countercurrent column 73 is charged through conduit 24 with partly regenerated absorbent from the flashing stage 93. This absorbent from flash chamber 93 removes the sulfur components which are contained in the exhaust gases so that the overhead product discharged through conduit 25 contains virtually no sulfur. Part of the high-$H_2S$ mixture of gas and absorbent vapor which has been driven off in the regenerating column 8 is recycled through conduit 26 into the lower part of the countercurrent column 73. The absorbent trickling in a countercurrent to that recycle gas takes up $H_2S$ from the recycle gas and is heated as a result of the cooling of the warm recycle gas entering the column and of the condensation of the methanol vapor contained in said gas. $CO_2$ is flashed off at the same time. To reduce the amount of recycle gas, the countercurrent absorbent is further heated in the heat exchanger 74. Absorbent flows from the bottom of the countercurrent column 73 through conduit 27 and through heat exchanger 85 into the regenerating column 8 provided with the reboiler 81 and dephlegmator 82. The high-$H_2S$ gas driven off is supplied partly as recycle gas in conduit 26 to the countercurrent column 73 and partly as exhaust gas through condenser 83 and conduit 28 to a plant for further processing, e.g., for the production of sulfur.

The pump 84 supplies the completely regenerated absorbent from the bottom of the regenerating column 8 through the heat exchangers 85, 74, and 95, where the absorbent is cooled down, and through the conduit 13 to the top of the $CO_2$ absorber 5.

The absorbent to be charged to the top of the countercurrent column and the absorbent which is to be regenerated only by flashing are withdrawn through conduit 29 from the bottom of the $CO_2$ absorber 5. These fluids flow jointly through a pressure relief device 30 into the flash chamber 91, where a first, partial flashing is effected to flash off virtually all $H_2$ and CO and some $CO_2$ dissolved in the absorbent from the second stage.

In the re-absorption zone 92 disposed over the flashing stage 91 most of the $CO_2$ is removed from the flashed-off gases with the aid of a partly regenerated absorbent. The latter is drawn by the pump 96 from the flashing stage 94 and is charged through conduits 19 and 31 to the absorption zone 92. The remaining gas flows through conduit 21 to the compressor 6. The absorbent which has re-absorbed $CO_2$ flows into the flashing stage 91 and together with the absorbent charged to that stage is flashed further in chamber 93, to which said absorbents are jointly supplied through conduit 32, which incorporates a pressure relief device 33. From the bottom of flash chamber 93, part of the absorbent flows through conduit 24 to the top of the countercurrent column 73. The rest flows through conduit 34, which incorporates a pressure relief device 35, into chamber 94, where it is flashed further and is heated in heat exchanger 95 by an indirect heat exchange with regenerated absorbent so that more gas is driven off.

A pump 97 supplies the flash-regenerated absorbent from the bottom of the flash chamber 94 through conduit 14 to the top of the coarse scrubbing zone 51. The pure $CO_2$ released in the flash chambers 93 and 94 is exhausted from the plant through conduit 36.

The $CO_2$ absorber 5 is provided with a cooling cycle to compensate refrigeration losses. A pump 53 sucks absorbent at the required rate from the bottom of the $CO_2$ absorber 5 and supplies it through the ammonia evaporator 54, where the required refrigeration is supplied, and in conduit 15 to a suitable point of the coarse scrubbing zone 51.

Heat exchangers for a recovery of refrigeration are not shown in order to simplify the flow diagram.

QUANTITATIVE EXAMPLE II

It may be assumed that the gas to be purified has been pre-cooled to a temperature below 0° C. and freed from condensate and that it has the following composition when entering the first stage of the gas purification system:

| | Percent |
|---|---|
| $CO_2$ | 30 |
| $H_2S$ | 1 |
| $H_2$ | 53 |
| CO | 14 |
| Balance ($CH_4$, $N_2$) | 2 |

It may be assumed that the plant is operated at a gas inlet rate of 100,000 standard cubic meters per hour and under an inlet pressure of 30 atmospheres absolute and that methanol is used as an absorbent.

In the heat exchanger system 43, the crude gas supplied through conduit 10 is cooled to about −30° C. by an indirect heat exchange with product gases, exhaust gases, and evaporating ammonia. When the condensate has been removed, the crude gas is supplied to the absorber 4 for removing the sulfur components. The desulfurized pressure gas from which $CO_2$ has not yet been removed leaves the $H_2S$ absorber 4 removal approximately at the same temperature and flows through conduit 11 into the $CO_2$ absorber 5. About 85% of the $CO_2$ contained in the gas are removed by scrubbing in the lower part 51 of the absorber 5 and the remaining 15% are removed in the upper part 52 of the absorber 5.

Gas having the following composition:

| | Percent, about |
|---|---|
| $H_2$ | 77 |
| CO | 20 |
| Balance ($CH_4/N_2$) | 3 | leaves the $CO_2$ absorber 5 at a rate of about 69,000 standard cubic meters per hour and a temperature of about −48° C. and under a pressure of about 28.2 atmospheres absolute. Methanol, at a rate of about 70 cubic meters per hour, is required for removing the sulfur components by scrubbing in the $H_2S$ absorber 4 and is withdrawn at a temperature of about −32° from the bottom of $CO_2$ absorber 5. The methanol draining from the $H_2S$ absorber 4 is flashed to about 8 atmospheres absolute in flash chamber 71, where gas is flashed off at a rate of about 1000 standard cubic meters per hour. From the flashed-off gas, about 700 standard cubic meters per hour are absorbed by methanol at a rate of about 15 cubic meters per hour in the re-absorption zone 72. The remaining flashed-off gas at a rate of 300 standard cubic meters per hour together with the corresponding gas from the stages 91, 92 for flashing off $CO_2$ are returned into the crude gas by the compressor 6.

Methanol, at a rate of 85 cubic meters per hour, supplied from chamber 71 is flashed to about 1.8 atmospheres absolute in the middle part of the countercurrent column 73. Methanol, at a rate of 70 cubic meters per hour and at a temperature of −58° C., is supplied to the top of the countercurrent column.

Both absorbent streams totalling about 155 cubic meters per hour are heated in the lower part of the countercurrent column by recycle gas at a rate of about 5000 cubic meters per hour and by methanol vapor at about 1000 standard cubic meters per hour as well as by the heat exchanger 74 and are pumped through the heat exchanger 85 into the regenerating column 8, which operates at about 2 atmospheres absolute.

Regenerated absorbent at a rate of about 155 cubic meters per hour flows through heat exchangers 85, 74, and 95, where it is cooled to about −50° C., to the top of the $CO_2$ absorber 5.

Exhaust gas which is virtually free of sulfur and at a temperature of about −55° C. and under a pressure of about 1.3 atmospheres absolute is discharged at a rate of about 15,000 standard cubic meters per hour from the countercurrent column 73.

About 40% of the gas driven off at a rate of about 7,500 standard cubic meters per hour in the regenerating column 8 consist of $H_2S$. Part of this gas is recycled at a rate of 5000 standard cubic meters per hour. The remaining gas at a rate of 2500 standard cubic meters per hour flows to the plant for further processing through condenser 83, where the methanol vapor contained in the gas is condensed out.

Methanol, at a rate of about 130 cubic meters per hour, flows from the bottom of the $CO_2$ absorber 5 to the regenerating column 9. Gas is flashed off at a rate of about 1500 standard cubic meters in the first flashing stage 91, which is operated at about 8 atmospheres absolute. Gas at a rate of about 1200 standard cubic meters per hour is removed from this flashed-off gas in the re-absorption zone 92, in which the gas is scrubbed with methanol at a rate of about 20 cubic meters per hour.

The remaining flashed-off gases at a rate of about 300 standard cubic meters per hour and gas at a rate of 300 standard cubic meters per hour from the chambers 71, 72 for flashing off $H_2S$ are returned by the compressor 6 into the crude gas.

Methanol which has been flashed to about 1.5 atmospheres absolute enters the flash chamber 93 at a rate of about 150 cubic meters per hour. Of this methanol, a stream of about 50 cubic meters per hour flows from chamber 93 to the top of the countercurrent column 73. The remaining methanol at a rate of 80 cubic meters per hour flows from chamber 93 into flash chamber 94, which is operated approximately at atmospheric pressure. From the methanol obtained at the top of chamber 94, a branch stream of about 35 cubic meters per hour is charged to the re-absorption zones 72 and 92. The remaining methanol at a rate of 45 cubic meters per hour flows through the heat exchanger 95, where it is heated to release more gas, and is then pumped to the top of the coarse washing zone 51. Virtually sulfur-free exhaust gas at a total rate of about 13,500 standard cubic meters per hour is discharged from the flash chambers 93 and 94.

What is claimed is:

1. In a process for purifying gases by the substantial removal of the $CO_2$ and $H_2S$ content thereof which process comprises passing said gas through an $H_2S$ absorption means; removing $H_2S$ from said gas with an absorbent at below about 0° C.; feeding the substantially $H_2S$-free gas from said $H_2S$ absorption means into the first stage of a two-stage $CO_2$ absorption means, feeding fresh absorbent to the second stage of said two-stage $CO_2$ absorption means, thence to the first stage of said $CO_2$ adsorption means and thence to said $H_2S$ absorption means, and recovering gas substantially free of $CO_2$ and $H_2S$ from the second stage of said $CO_2$ absorption means; the improvement comprising feeding $CO_2$-laden absorbent from said first $CO_2$ absorption stage partially to a second flashing means and partially to said $H_2S$ absorption means, flashing said $CO_2$-laden absorbent to partially regenerate such, feeding said partially regenerated absorbent to the first stage of said $CO_2$ absorption means, after flashing in said second flashing means, feeding $H_2S$ and $CO_2$-laden absorbent to a first flashing means, feeding flashed absorbent from said first flashing means to a hot regeneration, and feeding the substantially completely regenerated absorbent from said hot regeneration to the second stage of said $CO_2$ absorption means.

2. The improved process claimed in claim 1, wherein said absorbent to be partially regenerated in said second flashing means is cooled by heat exchange before this additional absorbent is regenerated.

3. The improved process claimed in claim 1 wherein the completely regenerated absorbent from said hot regeneration is cooled by an indirect heat exchange with partly regenerated absorbent from said $CO_2$ absorption means before said completely regenerated absorbent is supplied to the second stage of said $CO_2$ absorption means.

4. The improved process claimed in claim 1, wherein said absorption means operate at below about $-10°$ C.

5. The improved process claimed in claim 1, wherein the exhaust gas from said $H_2S$ absorption means has a low sulfur content and wherein the exhaust gas from said $CO_2$ absorption means is substantially carbon dioxide and sulfur-free.

6. The improved process claimed in claim 1, wherein said absorbent is fed to about the top of said $H_2S$ absorption means, to the second stage at the top and to the first stage at the middle of said $CO_2$ absorption means and wherein said gas is fed to about the bottom of both said absorption means.

7. The improved process claimed in claim 1, wherein the $CO_2$ content of said partially regenerated absorbent is about equal to the $CO_2$ content of said fully regenerated absorbent at the point of entry of said partially regenerated absorbent into said $CO_2$ absorption means.

8. The improved process claimed in claim 1, wherein said absorbent emitted from said $H_2S$ absorption means is regenerated by flashing and stripping.

9. The improved process claimed in claim 1, wherein said absorbent is at least one member selected from the group consisting of methanol and xylene.

10. The improved process in claim 1, wherein the gas released by partial flashing of the absorbent is compressed and then recycled into the feed gas to said process.

11. The improved process claimed in claim 1, wherein said absorbent issuing from said $H_2S$ absorption means is passed through a zone countercurrent to gas rich in $H_2S$.

12. The improved process claimed in claim 11, wherein absorbent issuing from said $CO_2$ absorption means is flashed to the pressure of said zone.

13. The improved process claimed in claim 11, wherein said countercurrent passage is carried out in a zone wherein said $H_2S$ absorption means absorbent is introduced intermediate the ends of said zone, said $H_2S$ rich gas is introduced at one end of said zone and substantially sulfur-free absorbent is introduced at the end of said zone opposite to the $H_2S$-gas admission end.

14. The improved process claimed in claim 13, wherein absorbent rich in $H_2S$ is withdrawn from said zone at the gas entry end thereof and is substantially completely regenerated.

15. The improved process claimed in claim 13, wherein substantially sulfur-free gas is withdrawn from the sulfur-free absorbent admission end of said counter-current passage zone.

16. The improved process claimed in claim 13, wherein liquid at the gas-entry end of said zone is heated.

17. The improved process claimed in claim 16, wherein said heating is indirect by means of substantially fully regenerated absorbent.

18. The improved process claimed in claim 16, wherein said heating is direct by means of said $H_2S$-rich gas.

References Cited

UNITED STATES PATENTS

| | | | |
|---|---|---|---|
| 2,863,527 | 12/1958 | Herbert et al. | 55—73 |
| 3,362,133 | 1/1968 | Kutsher et al. | 55—73 X |

FOREIGN PATENTS

| | | |
|---|---|---|
| 164,386 | 7/1955 | Australia. |
| 750,399 | 6/1956 | Great Britain. |

REUBEN FRIEDMAN, Primary Examiner

R. W. BURKS, Assistant Examiner

U.S. Cl. X.R.

55—73